March 16, 1965     C. J. HALL     3,173,809
ELECTRIC STORAGE BATTERY PLATES
Filed April 7, 1960
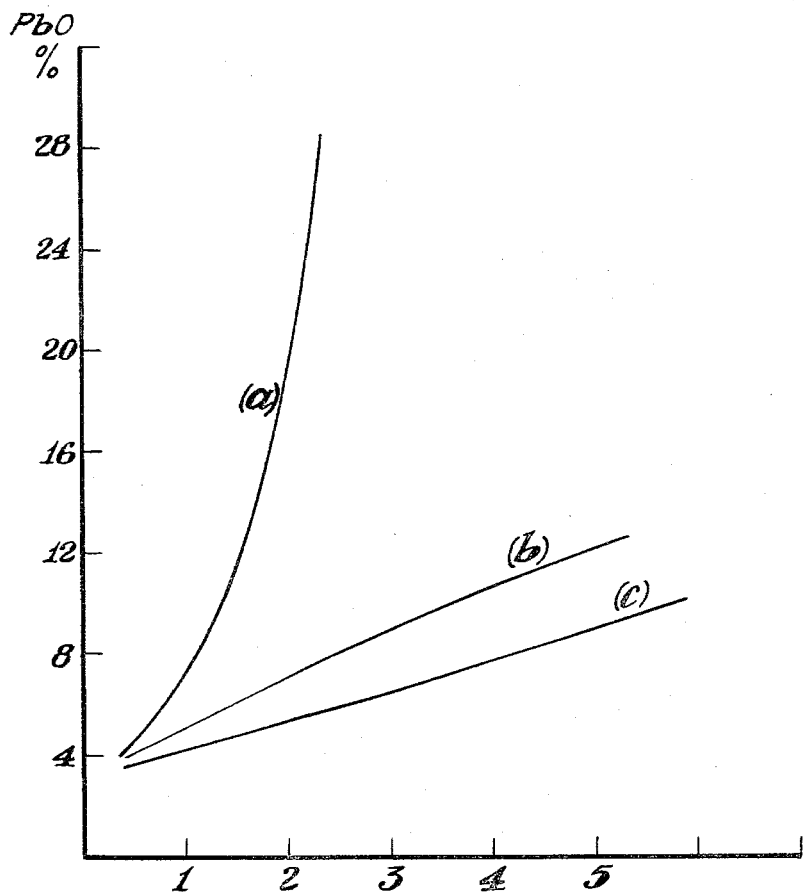

3,173,809
ELECTRIC STORAGE BATTERY PLATES
Clifford James Hall, Bolton, England, assignor to Chloride Batteries Limited, Swinton, England, a British company
Filed Apr. 7, 1960, Ser. No. 20,757
Claims priority, application Great Britain, May 1, 1959, 14,901/59
11 Claims. (Cl. 136—19)

This invention relates to electric storage batteries of the lead-acid type in which the positive and negative plates are assembled in the fully charged condition following the electrochemical process of formation and subsequent drying. In use such "dry-charged" batteries simply require to be filled with electrolyte and do not require any first charge before being put into operation.

The reduced spongy lead of the negative plate is highly active and particularly subject to oxidation, and when drying such plates for dry-charged batteries it is customary to use vacuum ovens or ovens filled with inert gas. If the dry-charged negatives are then stored for any length of time, either as plates or in assembled batteries, or stored under adverse conditions, for example in a humid atmosphere at relatively high ambient temperatures, the lead oxide content of the negative active material increases due to oxidation, the capacity of the plates falls and eventually the battery will no longer give the required output when first put into operation.

The object of the present invention is to provide dry-charged negative plates having a high order of resistance to atmospheric oxidation such that their charge retention properties are considerably improved.

The oxidation process is greatly accelerated or catalysed by the presence of moisture, and a further object of the invention is to provide negative plates which possess hydrophobic properties and are not easily wetted when in the dry-charged state.

According to the present invention a negative plate for a dry charged battery of the lead-acid type is provided in which the individual particles of the reduced active material are coated with a lead soap or mixture of lead soaps.

The invention further comprises a negative plate for a dry charged battery of the lead-acid type in which a part of the reduced active material is in chemical combination with a fatty acid or mixture of fatty acids to form a lead soap or soaps.

The invention still further comprises a negative plate for a dry charged battery of the lead-acid type in which the active material of the plate has been prepared by mixing a quantity of a free fatty acid or mixture of free fatty acids with powdered lead oxide, water and sulphuric acid to form a paste, the said fatty acid or acids combining with lead oxide to form a lead soap, so that after formation of the plate, individual particles of the reduced active material remain coated with an integral or combined layer of the lead soap.

In accordance with a particular feature of the invention, a dry charged negative plate for a battery of the lead-acid type includes active material comprising substantially pure sponge lead, individual particles of which are coated with a protective film in the form of an integral or combined layer of a lead soap, the lead soap having been formed by the addition of a free fatty acid or acids during the mixing of the powdered lead oxide and other starting materials.

The invention further comprises the method of making a dry-charged negative plate for a battery of the lead-acid type, the said plate having a high order of resistance to atmospheric oxidation, which comprises the steps of mixing a quantity of a free fatty acid or mixture of free fatty acids with powdered lead oxide, water and sulphuric acid to form a paste of active material, applying the paste to a negative grid, reducing the active material to sponge lead thereby producing a formed charged plate, and heating the plate in a non-oxidizing atmosphere to drive off excessive moisture while leaving the individual particles of the sponge lead coated with a combined or integral protective layer of a lead soap.

The fatty acids used preferably contain a long chain aliphatic grouping having at least ten carbon atoms and may be saturated or unsaturated. Examples of suitable saturated acids are stearic acid and palmitic acid, while in the case of unsaturated acids those having not more than one olefine link are preferred, for example, oleic acid.

Substituted fatty acids may also be used, for example hydroxystearic acid (saturated) and ricinoleic acid (unsaturated).

The amount of fatty acid or acids incorporated in the active material paste mix is preferably within the range of 0.02 to 0.25% of the weight of the dry powdered lead oxide starting material.

A method of making a dry charged negative plate in accordance with the present invention which has been found convenient and satisfactory will now be described by way of example.

The usual starting materials for the negative active material are used, namely water, powdered lead oxide, and any additives, for example expanders, which may normally be included in the manufacture of a negative plate for a lead-acid type battery.

After these materials have been mixed together, stearic acid is added, followed immediately by the addition of sulphuric acid, after which the materials are further mixed. The amount and concentration of sulphuric acid added are the same as would be used in conventional methods of producing negative active material paste, according to the desired density and plasticity required for subsequent pasting. Following the addition of the sulphuric acid the temperature of the paste mix rises to a maximum, reaching the order of 160° F., which just exceeds the melting point of the stearic acid thereby ensuring that the latter becomes dispersed uniformly throughout the paste during the further mixing thereof.

The stearic acid is added in an amount within the range of 0.02 to 0.25% of the weight of the powdered lead oxide starting material, the precise amount depending on the type of plate being manufactured and the application for which the final assembled battery is intended. It has been found that amounts within the range specified above provide the most satisfactory results. For example in the manufacture of plates for automobile starter batteries 0.05% of stearic acid is used. For thinner types of plate intended to provide a very high performance, amounts approaching the lower limit of the specified range are used, and for thicker types of plate intended for lower rates of performance amounts approaching the upper limit are used. Amounts of fatty acid in excess of the upper limit of the specified range, while in fact increasing the resistance of the subsequent dry charged plate to oxidation, at the same time produce protective films or coating of such thickness that the subsequent electrical performance of the battery is adversely affected over the first few cycles of the battery's life. The reasons for this will be explained in more detail hereinafter.

Following the completion of the paste mixing as normally carried out, the paste is applied to negative battery grids as by conventional pasting techniques. Upon completion of setting, the pasted negative grids are then subjected to electrochemical formation in a bath of dilute sulphuric acid (of a concentration not greater than 10%)

in the usual manner, whereby the lead oxide of the active material is reduced to substantially pure sponge lead and the pasted grids become fully charged plates. Finally the plates are washed in water and dried in a vacuum oven, in an oven filled with inert gas, or in any other manner designed to prevent the highly active sponge lead becoming oxidized.

After drying, the fully charged negative plates are assembled into batteries along with fully charged positive plates. Alternatively the negative and positive plates may be assembled as elements, fully charged, and both dried at the same time prior to completion of the battery assembly.

Dry charged negative plates, having active material in which a free fatty acid or acids has been added to the paste mix in accordance with the present invention, have a very high order of resistance to oxidation and possess greatly improved charge retention properties in that their charge is retained even through the plates themselves, or a battery containing such plates, may be stored for many months, without electrolyte and with the plates completely exposed to the atmosphere under very adverse conditions of temperature and humidity.

In the accompanying drawing is shown a graph showing the results of tests which illustrate the improvements provided by the present invention. The curves show the relative oxidation rates of various dry charged negative plates, of the type used in automobile starter batteries, the plates being identical as regards dimensions, amounts of active material and initial capacity.

Curve (a) shows the increase, during storage over a period of months, of the lead oxide content in the negative active material of dry charged plates containing no protective material or having had no protective treatment. Curve (b) shows how the content of lead oxide is markedly reduced when 0.05% of stearic acid is added to the paste mix, and curve (c) shows the further reduction when .25% of stearic acid is added. The tests were conducted under extremely severe conditions with the temperature at 150° F. and with 95% relative humidity, and it will be seen that, even after storage periods of up to five months, the lead oxide content is such that plates made according to the invention will still possess the greater part of their original charge, whereas the untreated plates will have lost substantially all their entire effective charge after a much shorter period. The plates containing from 0.05% to 0.25% of stearic acid are found to give immediate high performance when electrolyte is added to a battery in which they are used.

It is believed that the fatty acid combines with lead oxide in the paste mix to form a lead soap according to the equation:

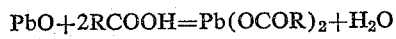

$$PbO + 2RCOOH = Pb(OCOR)_2 + H_2O$$

where R represents a long chain aliphatic grouping. During the electrochemical formation the lead soap is thought to be decomposed by the dilute sulphuric acid, while the lead oxide is being reduced to sponge lead as is well understood. However the fatty acid remains dispersed through the active material and during the drying stage recombination takes place, and in the fully formed and dried negative plate the individual particles of sponge lead are covered by a combined or integral layer of the lead soap. This layer of lead soap is substantially of molecular thickness, with the long chain aliphatic groupings chemically combined through carboxy linkages to particles of sponge lead. Aliphatic groupings having at least 10 carbon atoms are by nature hydrophobic. Their particular orientation in the form of an outer screen or film around the lead particles, induced by the mode of chemical combination, not only protects the individual particles of sponge lead but the existence of the film also renders the plates water repellent.

This last property is a very desirable feature of the invention, since as has been explained, the presence of any moisture greatly accelerates the oxidation of sponge lead. This feature can be very easily illustrated in practice by the fact that it is very difficult, if not impossible, to wet the plates produced in accordance with the present invention with water.

In order to prepare the dry-charged battery for use, it is only necessary to fill it with the electrolyte. The electrolyte, sulphuric acid of approximately 35% concentration, readily and completely destroys the lead soap in the negative plates by hydrolysis according to the following equation:

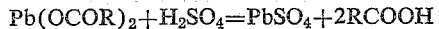

$$Pb(OCOR)_2 + H_2SO_4 = PbSO_4 + 2RCOOH$$

The negative plate is almost instantly wetted by the electrolyte acid with complete penetration of all the pores of the sponge lead active material, and the battery immediately responds to any rate of discharge.

As is seen from the above equation the hydrolysis also results in the formation of lead sulphate, but the amounts involved are so small as to have no effect on the subsequent discharge. Due to the action of the electrolyte acid, the fatty acid is completely liberated and floats to the surface of the electrolyte where it does not affect the performance of the battery during discharge or during subsequent charging.

The fatty acids are added to the paste mix only in those amounts necessary to provide effective resistance to subsequent oxidation of the sponge lead. Depending on the type of plate, amounts approaching, and in particular amounts greater than, the upper limit of the range previously specified namely 0.25%, can give rise to films of lead soap substantially thicker than that necessary to give adequate protection. The dry-charged plates then suffer from the disadvantage that when the electrolyte is added to the battery, the films of lead soap are hydrolysed more slowly. As a result the electrical performance of the battery is slightly reduced with a slight increase in the top of charge voltage, particularly over the initial cycles of its life, until the lead soap is completely decomposed and so removed from the active material.

In the case of plates for automobile starter batteries, as illustrated in the accompanying graph, an amount of 0.05% is found to give adequate protection while at the same time allowing an immediate high performance.

It will be appreciated that this disadvantage may always be present with dry-charged plates produced by previously proposed processes in which the sponge lead is protected by, for example, an oily film in a physical manner. Such a film remains in an unchanged state even after the electrolyte has been added and can adversely affect the electrical performance of the battery over the initial part of its life in service and possibly even longer.

In carrying out the invention, fatty acids may also be used which have melting points above the maximum temperature attained by the paste mix. However, such acids must be added in a finely dispersed state, for example as an aqueous emulsion. A surface active agent of the sulphated fatty alcohol type is suitable for emulsifying the fatty acids for this purpose.

From the foregoing description it will be appreciated that dry-charged negative plates having the improved properties provided by the present invention may be manufactured simply and economically, without entailing any major modifications to the standard methods of making conventional dry-charged plates or requiring any additional plant and equipment.

What is claimed is:
1. A water repellent dry activated negative plate for a dry charged battery of the lead acid type comprising a spongy particulate lead mass the individual particles of which are coated with an integral water repellant layer of lead soap of molecular thickness formed thereon by chemical reaction during in situ reduction of lead oxide aqueous paste having incorporated therein a relatively small quantity of a fatty acid having between ten and twenty carbon atoms.

2. A water repellent dry activated negative plate for a dry charged battery of the lead acid type comprising a spongy particulate lead mass the individual particles of which are coated with an integral water repellant layer of lead soap of molecular thickness formed thereon by chemical reaction during in situ reduction of lead oxide aqueous paste having incorporated therein a fatty acid having between ten and twenty carbon atoms in a quantity of between about 0.02–0.25% by weight of the lead oxide.

3. A water repellent dry activated negative plate for a dry charged battery of the lead acid type comprising a spongy particulate lead mass the individual particles of which are coated with an integral water repellant layer of lead soap of molecular thickness formed thereon by chemical reaction during in situ reduction of lead oxide aqueous paste having incorporated therein a relatively small quantity of a fatty acid selected from the group consisting of stearic acid, palmitic acid, oleic acid, hydroxystearic acid and ricinoleic acid.

4. A water repellent dry activated negative plate for a dry charged battery of the lead acid type comprising a spongy particulate lead mass the individual particles of which are coated with an integral water repellant layer of lead soap of molecular thickness formed thereon by chemical reaction during in situ reduction of lead oxide aqueous paste having incorporated therein a quantity of a fatty acid selected from the group consisting of stearic acid, palmitic acid, oleic acid, hydroxystearic acid and ricinoleic acid in a quantity of between about 0.02–0.25% by weight of the lead oxide.

5. A method of making a water repellent dry activated negative plate for a dry charged battery of the lead-acid type comprising mixing a relatively small quantity of a fatty acid having between ten and twenty carbon atoms with powdered lead oxide, incorporating water and sulphuric acid to form a paste, applying the paste to a negative grid, thereafter reducing the lead oxide to sponge lead and then drying the negative grid in an inert atmosphere leaving the individual particles of sponge lead coated with an integral protective layer of a lead soap.

6. A method for making a water repellent dry activated negative plate for a dry charged battery of the lead-acid type comprising mixing a quantity of a fatty acid having between ten and twenty carbon atoms with powdered lead oxide, said fatty acid being in a quantity of between about 0.02–0.25% by weight of the lead oxide, incorporating water and sulphuric acid to form a paste, applying the paste to a negative grid, thereafter reducing the lead oxide to sponge lead and then drying the negative grid in an inert atmosphere leaving the individual particles of sponge lead coated with an integral protective layer of a lead soap.

7. A method of making a water repellent dry activated negative plate for a dry charged battery of the lead-acid type comprising mixing a quantity of between about 0.02 and 0.25% by weight of a fatty acid selected from the group consisting of stearic acid, palmitic acid, oleic acid, hydroxystearic acid and ricinoleic acid with powdered lead oxide, incorporating water and sulphuric acid to form a paste, applying the paste to a negative grid, thereafter reducing the lead oxide to sponge lead and then drying the negative grid in an inert atmosphere leaving the individual particles of sponge lead coated with an integral protective layer of a lead soap.

8. A dry charged negative plate for a battery of the lead acid type, said plate being of active material comprising substantially pure sponge lead the individual particles of which are integrally combined with an outer protective film of water repellant lead soap of molecular thickness.

9. A dry charged negative plate as defined by claim 8 in which the lead soap is a lead salt of a fatty acid having between ten and twenty carbon atoms.

10. A dry charged negative plate as defined by claim 9 with the long chain of the aliphatic group chemically combined through carboxy linkages to the particles of sponge lead.

11. A dry charged negative plate as defined by claim 8 in which the fatty acid is selected from the group consisting of stearic acid, palmitic acid, oleic acid, hydroxystearic acid and ricinoleic acid.

References Cited by the Examiner

UNITED STATES PATENTS

| 566,231 | 8/96 | Schafer. |
| 1,508,732 | 9/24 | Thornley. |
| 1,817,846 | 8/31 | Reinhardt _____ 136—27 |
| 1,991,314 | 2/35 | Chamberlain. |
| 2,033,587 | 3/36 | Pearson. |
| 2,665,324 | 1/54 | McFarlane. |

FOREIGN PATENTS

| 220,944 | 9/25 | Great Britain. |
| 601,072 | 7/60 | Canada. |

OTHER REFERENCES

Messel et al.: Byulleten Izobreteniy, 1958, Nr 11, page 45 (USSR).

JOHN H. MACK, *Primary Examiner.*

JOHN R. SPECK, JOSEPH REBOLD, *Examiners.*